SELF-POWERED PULSE RADIO TRANSMITTER

Filed Dec. 5, 1962

INVENTOR
JAMES P. KOSTA, JR.

United States Patent Office 3,230,455

Patented Jan. 18, 1966

3,230,455

SELF-POWERED PULSE RADIO TRANSMITTER

James P. Kosta, Jr., Birmingham, Mich.
(Apt. 203, 2200 Lake Road, Belmont, Calif. 94002)

Filed Dec. 5, 1962, Ser. No. 242,413
3 Claims. (Cl. 325—185)

This invention relates to the transmission of radio frequency pulses without the need of stored electrical energy or external electrical energy, for remote radio control single channel and multi-channel uses.

Present-day radio control transmitters are such that an external electrical power source is required to activate the transmitter.

The purpose of this invention is to produce radio frequency transmissions without the need of a battery or other external electrical power.

It is the further purpose of this invention to produce pulses of radio frequency energy which will make such transmissions useable in remote radio control applications.

By this invention, radio frequency pulses of a predetermined pulse rate can be transmitted. A radio receiver tuned to the same radio frequency as this transmitter, and having a means of sensing the pulse rate of the transmissions, can be used. It can now be seen that this self-powered transmitter will be useful in applications such as the remote control of garage doors, lights and television sets, to cite a few examples.

The pulse rate of the radio frequency transmissions can be varied in a given transmitter to provide multi-channel operation of the transmitter.

The transmitter consists of an electro-mechanical transducer and an oscillator circuit consisting of a transistor with emitter, collector and base electrodes, a load resistor, a resonant tank circuit having a frequency controlling crystal, capacitor and coil and an antenna.

The transmitter operates in the following way: an electro-mechanical transducer is actuated mechanically. This causes an alternating current to be developed by the transducer. This alternating current is conductively coupled, and without any rectification, to the oscillator circuit. With each cycle of the alternating current, a pulse of radio frequency energy is emitted by the oscillator. The pulse rate of these emissions is determined by the frequency of the alternating current developed by the transducer.

By referring to the following specifications and drawing, the objectives of this invention can be readily understood.

Figure 1:
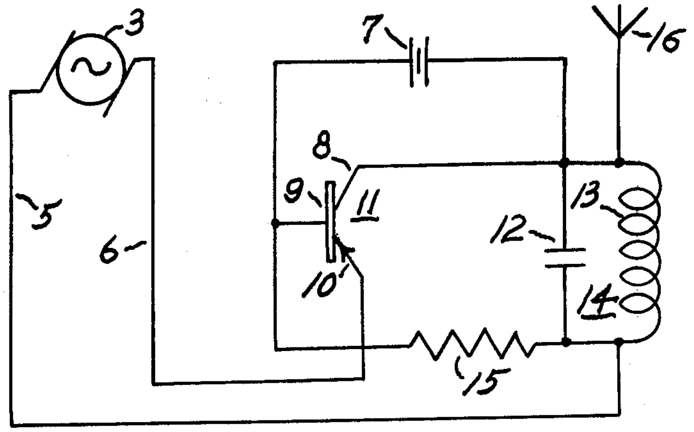
FIGURE 1 is a circuit diagram showing a configuration of the present invention using a common type rotary electro-mechanical transducer as the sole source of electrical energy. This same transducer also establishes the pulse rate of the radio frequency transmissions.

Referring specifically to FIGURE 1, the electrical energy developed by a common type, mechanically actuated, rotary alternating current transducer 3 is conductively coupled by line 6 to emitter 10 of transducer 11 and conductively coupled by line 5 through load resistor 15 to base 9 of transistor 11, and also by line 5 to the bottom of tank circuit 14. Collector 8 of transistor 11 is connected to the top of tank circuit 14 which consists of capacitor 12 in parallel with coil 13. The radio frequency energy of tank circuit 14 is emitted by antenna 16. The radio frequency is further controlled by crystal 7 connected between base 9 of transistor 11 and the top of tank circuit 14.

Electro-mechanical transducer 3 develops an alternating current the frequency of which is a product of the speed of the rotor of the transducer. Since the oscillator responds to each cycle of the transducer by emitting a pulse of radio frequency energy, the transducer thus controls the number of radio frequency energy pulses emitted by the oscillator during a given time period.

Figure 2:
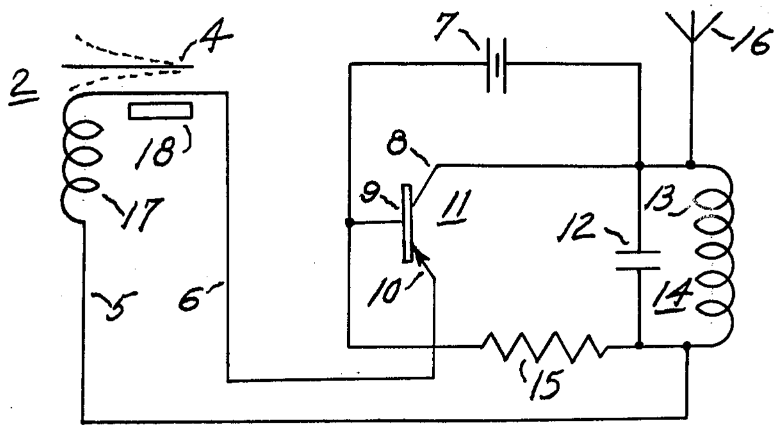
FIGURE 2 is a circuit diagram of the present invention using a common type resonant reed alternating current electro-mechanical transducer as the sole source of electrical energy. This same transducer also establishes the pulse rate of the radio frequency transmissions.

Now referring specifically to FIGURE 2, it can be seen that the only change between FIGURE 1 and FIGURE 2 is in the type of electro-mechanical transducer used as the sole source of electrical energy for the oscillator circuit and as a control for the pulse rate of radio frequency energy emitted by the oscillator. Therefore, the only change necessary in the component reference numbers is the reference number of the transducer and the addition of its component parts. All other component reference numbers remain the same in both circuits as the balance of the components perform exactly the same function in both circuits.

Observe electro-mechanical transducer 2 in FIGURE 2. This is a common type resonant reed alternating current transducer. This transducer consists of metal reed 4, coil 17 and permanent magnet 18. The length of reed 4 and the material used determines the natural mechanical resonant frequency of reed 4. When reed 4 is mechanically disturbed, it varies the magnetic flux of permanent magnet 18. These flux lines pass through coil 17. When the flux lines are varied by the movement of reed 4, an alternating current is induced into coil 17. The frequency of this current is the product of the mechanical resonant frequency of reed 4.

The alternating current thus developed by transducer 2 is then conductively coupled to the oscillator circuit and becomes the sole source of electrical energy for this circuit. At this point, the circuit performs exactly as previously described for the circuit in FIGURE 1.

By mounting a number of reeds on transducer 2, with each reed having a different mechanical resonant frequency, multi-channel operation of the transmitter is thus achieved.

What is claimed is:

1. A pulsed radio transmitter for selectively transmitting a pulsed continuous electromagnetic wave; said transmitter comprising a transistor having a base electrode, a collector electrode and an emitter electrode; a selectively operated source of alternating current for supplying energy to said transistor; pure resistive means for connecting said base electrode to one side of said source to apply to the base electrode a potential at every other half-cycle of the alternating current to render said transistor conductive; means for directly connecting said emitter electrode to the other side of said source to supply a return path for the current applied to said base electrode; a tank circuit tuned to the frequency of the continuous wave for producing oscillations at said frequency when pulsed with current from said source; means for directly connecting said collector electrode to one side of said tank circuit to supply current from said source to said tank circuit when said transistor becomes conductive;

means for directly connecting the other side of said tank circuit to the one side of said source to supply a return path for the current applied to the tank circuit from said collector electrode; and a feedback path; said feedback path comprising a frequency stabilizing crystal; means for directly connecting one side of said crystal to said one side of the tank circuit and means for directly connecting the other side of said crystal to said base electrode.

2. The transmitter defined in claim 1 wherein said source of alternating current comprises a mechanically driven rotary transducer.

3. The transmitter defined in claim 1 wherein said source of alternating current comprises an electro-mechanical transducer having a permanent magnet, a reed of magnetic material vibrating in the field from said permanent magnet, and a coil situated within the magnetic field of said permanent magnet and influenced by the changes in the flux caused by the vibrations of said reed.

References Cited by the Examiner

UNITED STATES PATENTS

| | | | |
|---|---|---|---|
| 2,884,526 | 4/1959 | Cortese | 331—116 |
| 2,887,573 | 5/1959 | Hruska | 331—116 |
| 2,889,460 | 6/1959 | Ehret | 331—185 |
| 2,928,052 | 3/1960 | Wood | 331—185 |
| 2,999,926 | 9/1961 | Jenny | 325—185 |
| 3,002,087 | 9/1961 | Holt | 325—185 |
| 3,046,491 | 7/1962 | Lackoff | 331—116 |
| 3,077,574 | 2/1963 | Marks | 325—185 |

FOREIGN PATENTS 287,171 6/1928 Great Britan.

OTHER REFERENCES

Terman: Electronic and Radio Engineering, McGraw-Hill, 3rd edition, 1947, pp. 506–519.

DAVID G. REDINBAUGH, *Primary Examiner.*